US012741608B2

(12) United States Patent
Ototsuji

(10) Patent No.: US 12,741,608 B2
(45) Date of Patent: Sep. 22, 2026

(54) AIRBAG APPARATUS

(71) Applicant: SUBARU CORPORATION, Tokyo (JP)

(72) Inventor: Daisuke Ototsuji, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 19/354,443

(22) Filed: Oct. 9, 2025

(65) Prior Publication Data

US 2026/0109313 A1 Apr. 23, 2026

(30) Foreign Application Priority Data

Oct. 21, 2024 (JP) ................................ 2024-185630

(51) Int. Cl.
*B60R 21/36* (2011.01)
*B60R 21/34* (2011.01)

(52) U.S. Cl.
CPC ........ *B60R 21/36* (2013.01); *B60R 2021/346* (2013.01)

(58) Field of Classification Search
CPC .... B60R 21/36; B60R 2021/346; B60R 21/34
See application file for complete search history.

(56) References Cited

U.S. PATENT DOCUMENTS 7,390,014 B2 * 6/2008 Takimoto ................ B60R 21/36 280/730.1
9,650,014 B2 * 5/2017 Suemune ................ B60R 21/36
2003/0178239 A1 * 9/2003 Takimoto ................ B60R 21/36 180/274
2006/0201731 A1 * 9/2006 Nakamura .............. B60R 21/36 180/274

FOREIGN PATENT DOCUMENTS

EP 1681212 A2 7/2006
JP 2006-219116 A 8/2006

* cited by examiner

*Primary Examiner* — Jason D Shanske
*Assistant Examiner* — Tiffany L Webb
(74) *Attorney, Agent, or Firm* — McGinn IP Law Group, PLLC

(57) ABSTRACT

An airbag apparatus includes a lower chamber disposed on a front surface of a vehicle, and an upper chamber located vertically above the lower chamber and supported by the lower chamber. The lower chamber has an annular shape. The upper chamber includes a first extension and a pair of second extensions. The first extension extending in a vehicle left-right direction of the vehicle along a front portion of the lower chamber. Each of the second extensions extends in a vehicle front-rear direction of the vehicle along a corresponding one of side portions of the lower chamber.

8 Claims, 7 Drawing Sheets 10
18
120
102
16
F
110
114
116a
116b
128
118
118
128
124a
124b
128
112a
122
128
118
104
112
118
100
14
REAR DIRECTION
RIGHT DIRECTION
LEFT DIRECTION
FRONT DIRECTION 10
100
18
120
102
16
F
110
114
128
118
118
128
124a
124b
128
112a
122
128
118
104
112
118
100
14
REAR DIRECTION
RIGHT DIRECTION
LEFT DIRECTION
FRONT DIRECTION 10
102
222
18
220
118
128
16
F
110
114
128
118
118
128
124a
128
112a
122
128
124b
118
104
112
118
100
14
REAR DIRECTION
RIGHT DIRECTION
LEFT DIRECTION
FRONT DIRECTION 120
118
ST1
120a
118
110
120b
118
120
118
320
320
120a
118
118
120b
310
310
ST2
300
110
120
118
118
320
320
310
118
118
310
300
ST3
110

AIRBAG APPARATUS

CROSS-REFERENCE TO RELATED APPLICATIONS

The present application claims priority from Japanese Patent Application No. 2024-185630 filed on Oct. 21, 2024, the entire contents of which are hereby incorporated by reference.

BACKGROUND

The disclosure relates to an airbag apparatus.

In order to protect an occupant of a bicycle, a motorcycle, or the like, or a pedestrian upon a collision with a bicycle, a motorcycle, or the like, or a pedestrian, a vehicle equipped with an airbag apparatus deployed on a front surface of the vehicle has become popular. An occupant of a bicycle, a motorcycle, or the like, or a pedestrian is hereinafter referred to as a pedestrian or the like.

SUMMARY

An aspect of the disclosure provides an airbag apparatus. The airbag apparatus includes a lower chamber disposed on a front surface of a vehicle, and an upper chamber located vertically above the lower chamber and supported by the lower chamber. The lower chamber has an annular shape. The upper chamber includes a first extension and a pair of second extensions. The first extension extends in a vehicle left-right direction of the vehicle along a front portion of the lower chamber. Each of the second extensions extends in a vehicle front-rear direction of the vehicle along a corresponding one of side portions of the lower chamber.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

Figure 1:
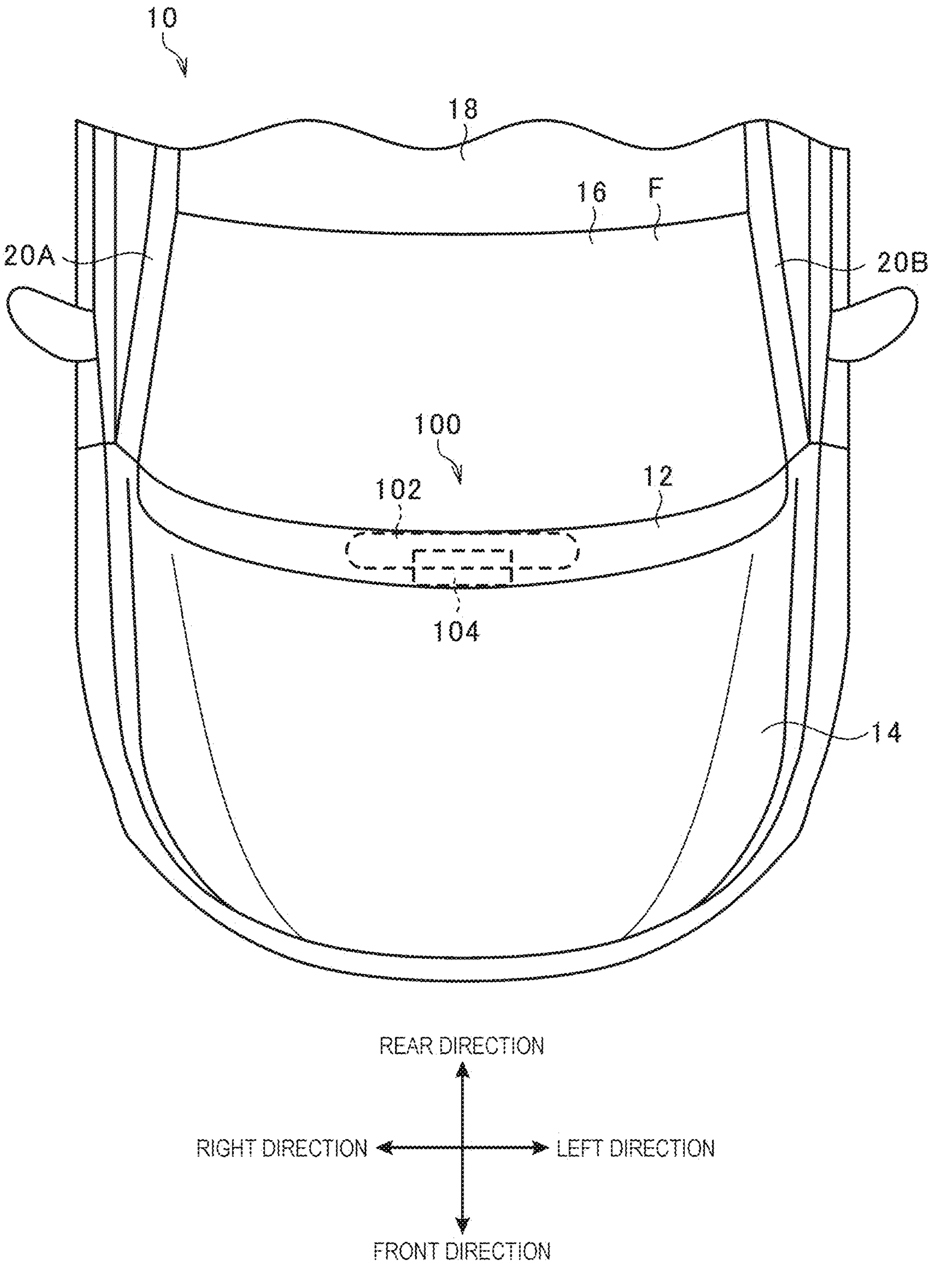
FIG. 1 is a schematic diagram illustrating a schematic configuration of an airbag apparatus according to an embodiment of the disclosure before deployment.

For example, Japanese Unexamined Patent Application Publication (JP-A) No. 2006-219116 discloses an automobile including a substantially U-shaped airbag including a base portion deployed along a cowl top panel and a pair of side portions deployed along left and right A-pillars of a windshield.

However, in the related art such as the technique disclosed in JP-A No. 2006-219116, when the airbag is rapidly expanded, the airbag greatly swings and may exhibit unstable behavior. Therefore, for example, in the technique disclosed in JP-A No. 2006-219116, the airbag may deviate from the cowl top panel, the A-pillars, or the like, resulting in insufficient protection for a pedestrian or the like.

It is desirable to provide an airbag apparatus capable of preventing a decrease in protection performance of an airbag.

Embodiments of the disclosure will be described hereinafter in detail with reference to the accompanying drawings. Specific dimensions, materials, numerical values, or the like described in the embodiments are merely examples for facilitating the understanding of the disclosure, and are not intended to limit the disclosure unless otherwise specified. In the specification and the drawings, elements having substantially the same effects and configurations are denoted by the same reference signs, and duplicate descriptions will be omitted. Elements which are not directly related to the disclosure may be omitted in the drawings.

1. Configuration of Airbag Apparatus

Figure 2:
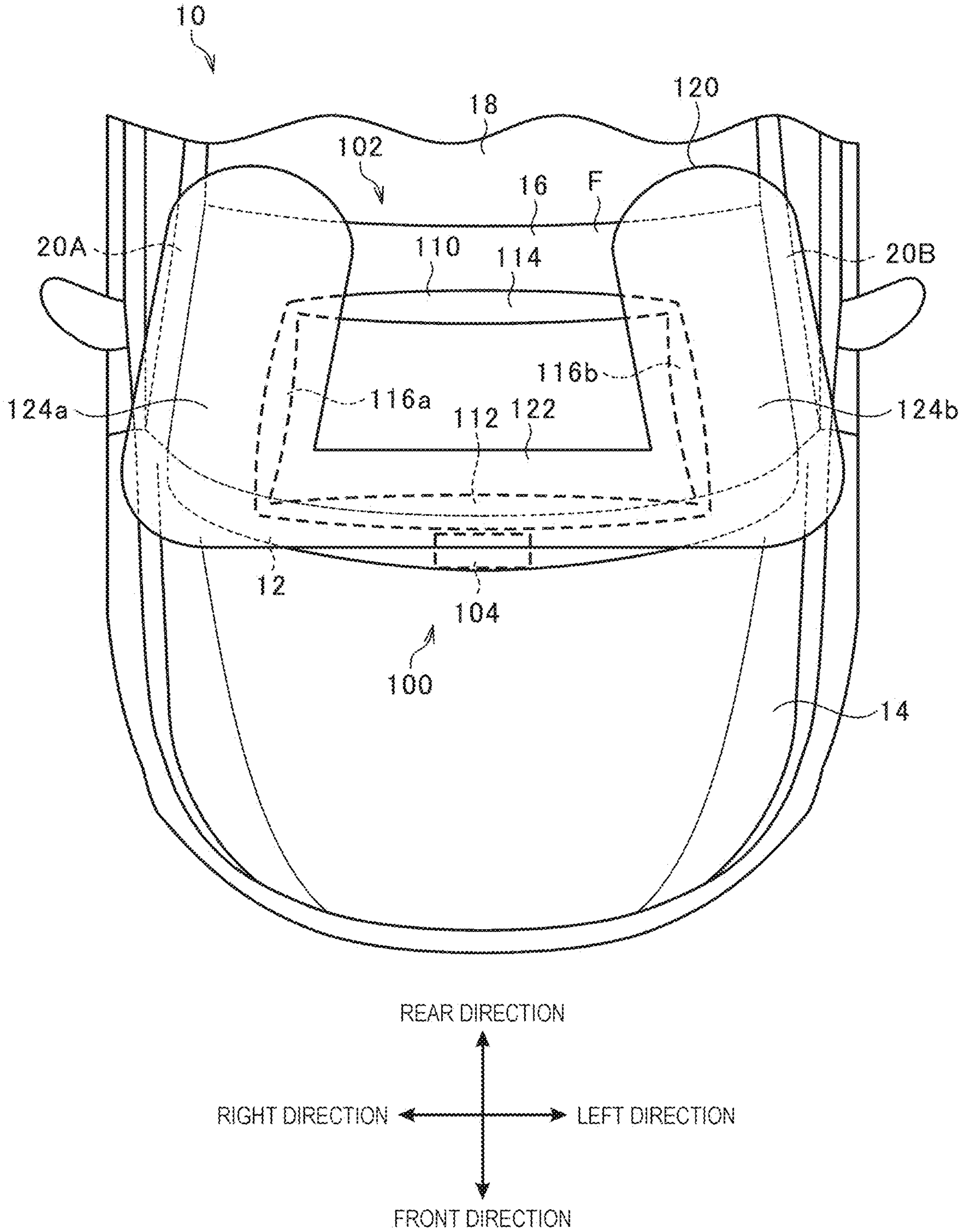
FIG. 2 is a first schematic diagram illustrating a schematic configuration of the airbag apparatus according to the embodiment after deployment.
Figure 3:
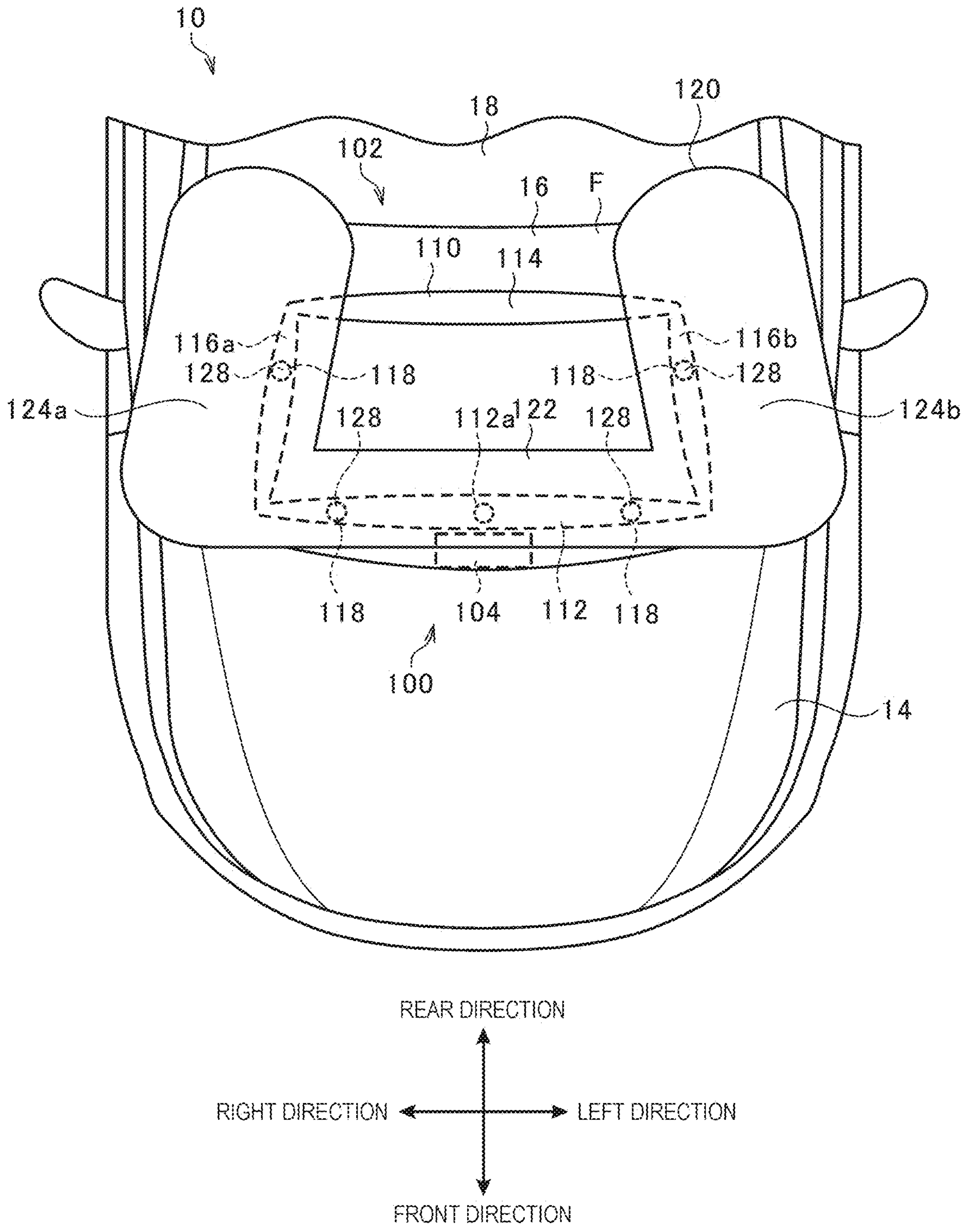
FIG. 3 is a second schematic diagram illustrating a schematic configuration of the airbag apparatus according to the embodiment after deployment.

First, a configuration of an airbag apparatus 100 according to the embodiment of the disclosure will be described with reference to FIGS. 1 to 3. FIG. 1 is a schematic diagram illustrating a schematic configuration of the airbag apparatus 100 according to the embodiment of the disclosure before deployment. FIG. 2 is a first schematic diagram illustrating a schematic configuration of the airbag apparatus 100 according to the embodiment of the disclosure after deployment. FIG. 3 is a second schematic diagram illustrating a schematic configuration of the airbag apparatus 100 according to the embodiment of the disclosure after deployment.

As illustrated in FIGS. 1 to 3, the airbag apparatus 100 is disposed in a vehicle 10. The airbag apparatus 100 includes, for example, an airbag 102 and an inflator 104. Before the airbag apparatus 100 is deployed, the airbag apparatus 100 is disposed in a rear portion of an engine room under a cowl top panel 12 or under a hood 14 of the vehicle 10.

In the vehicle 10, when a collision with a bicycle, a motorcycle, or the like, or a pedestrian is detected, gas is supplied from the inflator 104 to the airbag 102. Thus, the airbag 102 is deployed from between the cowl top panel 12 and a windshield 16 onto a front surface F of the vehicle 10. The number of the inflators 104 is not limited.

As illustrated in FIGS. 2 and 3, the airbag 102 includes a lower chamber 110 and an upper chamber 120. Hereinafter, arrangements, shapes, pressures, or the like of the lower chamber 110 and the upper chamber 120 in deployment will be described.

The lower chamber 110 is disposed on the front surface F of the vehicle 10. The front surface F of the vehicle 10 is a portion including at least the windshield 16 of the vehicle 10. As illustrated in FIG. 2, the lower chamber 110 is disposed, for example, from above the cowl top panel 12 to above the windshield 16. The lower chamber 110 may be disposed at least above the windshield 16. For example, the lower chamber 110 may be disposed above the windshield 16 or may be disposed from above the windshield 16 to above the hood 14.

The lower chamber 110 has an annular shape. The lower chamber 110 may have, for example, a rectangular annular shape. In the embodiment, the lower chamber 110 includes a front portion 112, a rear portion 114, and side portions 116*a* and 116*b* in a pair. In the embodiment, internal spaces of the front portion 112, the rear portion 114, the side portion 116*a*, and the side portion 116*b* communicate with one another. A shape of a cross section orthogonal to an extending direction of the front portion 112, the rear portion 114, and the side portions 116*a* and 116*b* is, for example, a true circle.

The front portion 112 is disposed, for example, from above the cowl top panel 12 to above the windshield 16. The front portion 112 extends in a vehicle left-right direction. The front portion 112 has, for example, a shape extending in a direction along a shape of a boundary between the cowl top panel 12 and the windshield 16.

The rear portion 114 is disposed above the windshield 16. The rear portion 114 extends in the vehicle left-right direction. The rear portion 114 has, for example, a shape extending in a direction along a shape of a front portion of a roof 18.

The side portions 116*a* and 116*b* extend along the windshield 16 from a front direction to a rear direction of the vehicle 10. The side portion 116*a* has, for example, a shape extending in a direction along a shape of an A-pillar 20A provided on a right side of the vehicle 10. Similarly, the side portion 116*b* has, for example, a shape extending in a direction along a shape of an A-pillar 20B provided on a left side of the vehicle 10.

A communication portion between the front portion 112 and the side portion 116*a*, a communication portion between the front portion 112 and the side portion 116*b*, a communication portion between the rear portion 114 and the side portion 116*a*, and a communication portion between the rear portion 114 and the side portion 116*b* may be narrowed down. In one example, a passage cross-sectional area of the communication portion between the front portion 112 and the side portion 116*a* is narrower than a passage cross-sectional area of the internal space of the front portion 112 and a passage cross-sectional area of the internal space of the side portion 116*a*. A passage cross-sectional area of the communication portion between the front portion 112 and the side portion 116*b* is narrower than a passage cross-sectional area of the internal space of the front portion 112 and a passage cross-sectional area of the internal space of the side portion 116*b*. Similarly, a passage cross-sectional area of the communication portion between the rear portion 114 and the side portion 116*a* is narrower than a passage cross-sectional area of the internal space of the rear portion 114 and a passage cross-sectional area of the internal space of the side portion 116*a*. A passage cross-sectional area of the communication portion between the rear portion 114 and the side portion 116*b* is narrower than a passage cross-sectional area of the internal space of the rear portion 114 and a passage cross-sectional area of the internal space of the side portion 116*b*. Thus, the lower chamber 110 can have a shape extending in a direction along the cowl top panel 12, the roof 18, and the A-pillars 20A and 20B.

The upper chamber 120 is located vertically above the lower chamber 110, and is supported by the lower chamber 110. The upper chamber 120 covers the boundary between the cowl top panel 12 and the windshield 16, the A-pillars 20A and 20B, and a part of the front portion of the roof 18. The lower chamber 110 may have a pressure higher than that of the upper chamber 120. The upper chamber 120 may be deployed later than the deployment of the lower chamber 110.

The upper chamber 120 has, for example, a U shape. In the embodiment, the upper chamber 120 includes a first extension 122 and second extensions 124*a* and 124*b* in a pair. In the embodiment, internal spaces of the first extension 122, the second extension 124*a*, and the second extension 124*b* communicate with one another. Tether that restrict expansion in an up-down direction may be provided in the internal spaces of the first extension 122, the second extension 124*a*, and the second extension 124*b*. In this case, a shape of a cross section orthogonal to an extending direction of the first extension 122 is an ellipse having a long axis along a vehicle front-rear direction. A shape of a cross section orthogonal to an extending direction of the second extension 124*a* and a shape of a cross section orthogonal to an extending direction of the second extension 124*b* are ellipses having long axes along the vehicle left-right direction.

The first extension 122 extends in the vehicle left-right direction along the front portion 112 of the lower chamber 110. The first extension 122 is deployed, for example, above the front portion 112 of the lower chamber 110. The first extension 122 is sewn, for example, to the front portion 112 of the lower chamber 110. The first extension 122 has a shape extending in a direction along the shape of the boundary between the cowl top panel 12 and the windshield 16. A length of the first extension 122 in the vehicle front-rear direction is longer than a length of the front portion 112 of the lower chamber 110 in the vehicle front-rear direction. The first extension 122 covers at least the boundary between the cowl top panel 12 and the windshield 16.

The second extension 124*a* extends in the vehicle front-rear direction along the side portion 116*a* of the lower chamber 110. The second extension 124*a* is deployed, for example, above the side portion 116*a* of the lower chamber 110. The second extension 124*a* is sewn, for example, to the side portion 116*a* of the lower chamber 110. The second extension 124*a* has a shape extending in a direction along the shape of the A-pillar 20A. A length of the second extension 124*a* in the vehicle left-right direction is longer than a length of the side portion 116*a* of the lower chamber 110 in the vehicle front-rear direction.

A coupling portion that is a portion where the first extension 122 and the second extension 124*a* are coupled to each other covers a portion on the right side of the vehicle 10 among the boundary between the cowl top panel 12 and the windshield 16. This coupling portion refers to, for example, a bent portion of the upper chamber 120 on the right front side. The second extension 124*a* covers the boundary between the cowl top panel 12 and the windshield 16 from a portion on the right side of the vehicle 10 to the A-pillar 20A. A tip, that is, a rear portion of the second extension 124*a* covers a portion on the right side of the vehicle 10 among the front portion of the roof 18.

The second extension 124*b* extends in the vehicle front-rear direction along the side portion 116*b* of the lower chamber 110. The second extension 124*b* is deployed, for example, above the side portion 116*b* of the lower chamber 110. The second extension 124*b* is sewn, for example, to the side portion 116*b* of the lower chamber 110. The second extension 124*b* has a shape extending in a direction along the shape of the A-pillar 20B. A length of the second extension 124*b* in the vehicle left-right direction is longer than a length of the side portion 116*b* of the lower chamber 110 in the vehicle front-rear direction.

A coupling portion that is a portion where the first extension 122 and the second extension 124*b* are coupled to each other covers a portion on the left side of the vehicle 10 among the boundary between the cowl top panel 12 and the windshield 16. This coupling portion refers to, for example, a bent portion of the upper chamber 120 on the left front side. The second extension 124*b* covers the boundary between the cowl top panel 12 and the windshield 16 from a portion on the left side of the vehicle 10 to the A-pillar 20B. A tip, that is, a rear portion of the second extension 124*b* covers a portion on the left side of the vehicle 10 among the front portion of the roof 18.

Herein, a coupling relationship between the inflator 104 and each of the lower chamber 110 and the upper chamber 120 will be described. FIG. 3 illustrates an inflow port 112*a*, communication ports 118, and pressure adjustment mechanisms 128, which are not illustrated in FIG. 2. As illustrated in FIG. 3, the inflow port 112*a* is provided in a lower portion of the front portion 112 of the lower chamber 110. The inflow port 112*a* communicates with the inflator 104. The communication ports 118 are provided in an upper portion of the front portion 112, an upper portion of the side portion 116*a*, and an upper portion of the side portion 116*b* of the lower chamber 110. The communication port 118 provided in the front portion 112 of the lower chamber 110 communicates with the first extension 122 of the upper chamber 120. The communication port 118 provided in the side portion 116*a* of the lower chamber 110 communicates with the second extension 124*a* of the upper chamber 120. The communication port 118 provided in the side portion 116*b* of the lower chamber 110 communicates with the second extension 124*b* of the upper chamber 120.

The pressure adjustment mechanism 128 is provided on each of the communication ports 118. The pressure adjustment mechanism 128 includes, for example, a check valve. Until a pressure in the lower chamber 110 reaches a first pressure, that is, when the pressure is less than the first pressure, for example, the pressure adjustment mechanism 128 according to the embodiment is configured such that the gas does not flow into the upper chamber 120 from the lower chamber 110 through the communication port 118. When the pressure in the lower chamber 110 reaches the first pressure, the pressure adjustment mechanism 128 causes the gas to flow into the upper chamber 120 from the lower chamber 110 through the communication port 118. Thus, when a pressure in the upper chamber 120 reaches a second pressure, the pressure adjustment mechanism 128 stops the gas from flowing into the upper chamber 120 from the lower chamber 110 through the communication port 118. The first pressure is larger than the second pressure. The second pressure is a pressure higher than the atmospheric pressure, and is set to a pressure suitable for protecting a pedestrian or the like.

An operation of the pressure adjustment mechanism 128 is not limited to that described above. Until the pressure in the lower chamber 110 reaches the second pressure, that is, when the pressure is less than the second pressure, for example, the pressure adjustment mechanism 128 may be configured such that the gas does not flow from the lower chamber 110 into the upper chamber 120 through the communication port 118. When the pressure in the lower chamber 110 reaches the second pressure, the pressure adjustment mechanism 128 may cause the gas to flow into the upper chamber 120 from the lower chamber 110 through the communication port 118. Thus, when a pressure in the upper chamber 120 reaches a second pressure, the pressure adjustment mechanism 128 stops the gas from flowing into the upper chamber 120 from the lower chamber 110 through the communication port 118. In this case, after the inflow of the gas from the lower chamber 110 into the upper chamber 120 is stopped by the pressure adjustment mechanism 128, the inflator 104 raises the pressure in the lower chamber 110 to the first pressure. Even when the pressure in the lower chamber 110 is increased to the first pressure, the pressure adjustment mechanism 128 stops backflow of the gas from the upper chamber 120 to the lower chamber 110.

Accordingly, in the embodiment, internal spaces of the lower chamber 110 and the upper chamber 120 communicate with each other through the communication ports 118. The pressure adjustment mechanism 128 is provided on the communication port 118. Due to an effect of the pressure adjustment mechanism 128, the upper chamber 120 is deployed later than the deployment of the lower chamber 110. Due to the effect of the pressure adjustment mechanism 128, the lower chamber 110 has a pressure higher than that of the upper chamber 120.

2. Operation of Airbag Apparatus

Figure 4:
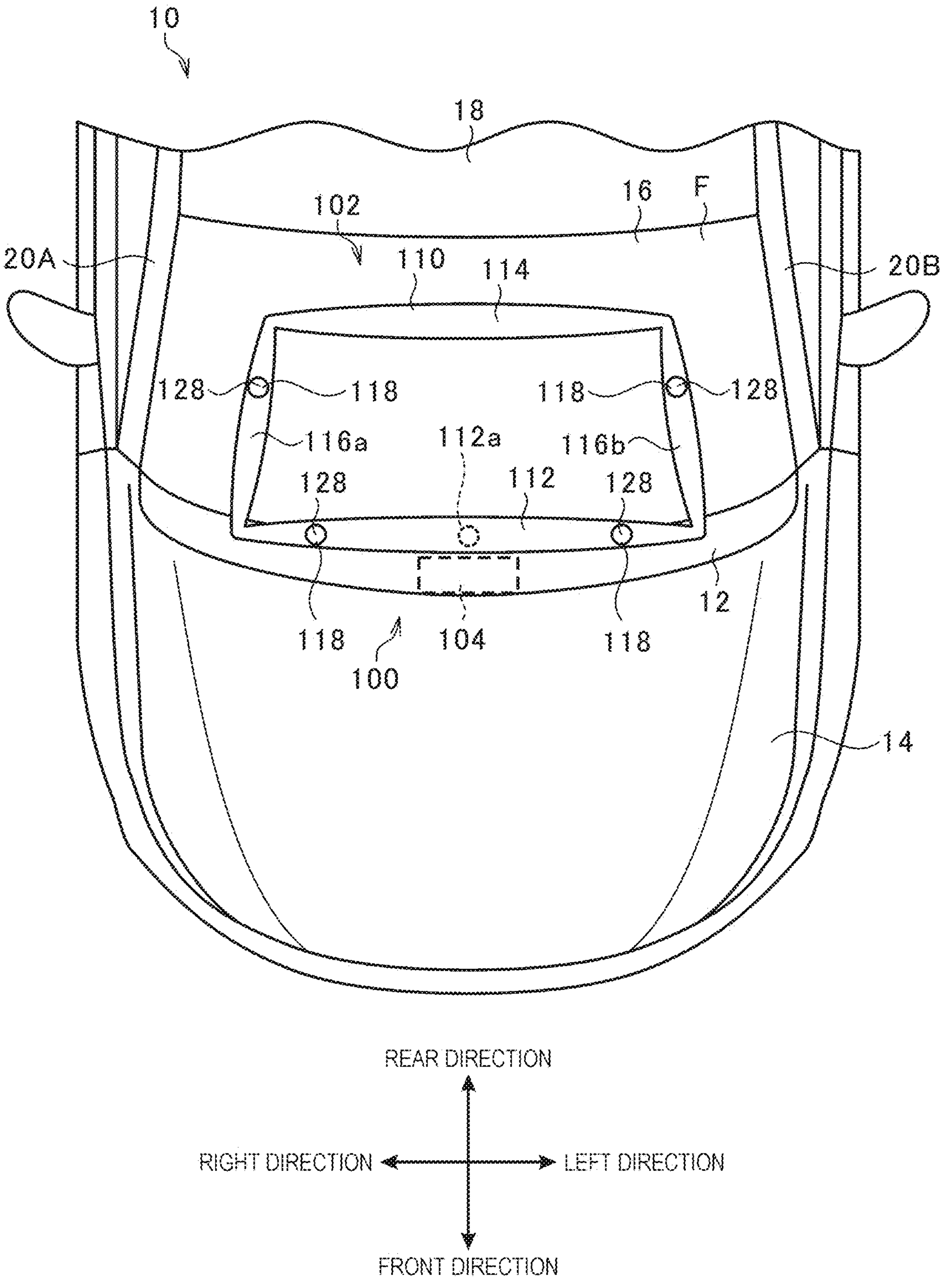
FIG. 4 is a diagram illustrating a deployment process of a lower chamber according to the embodiment.
Figure 5:
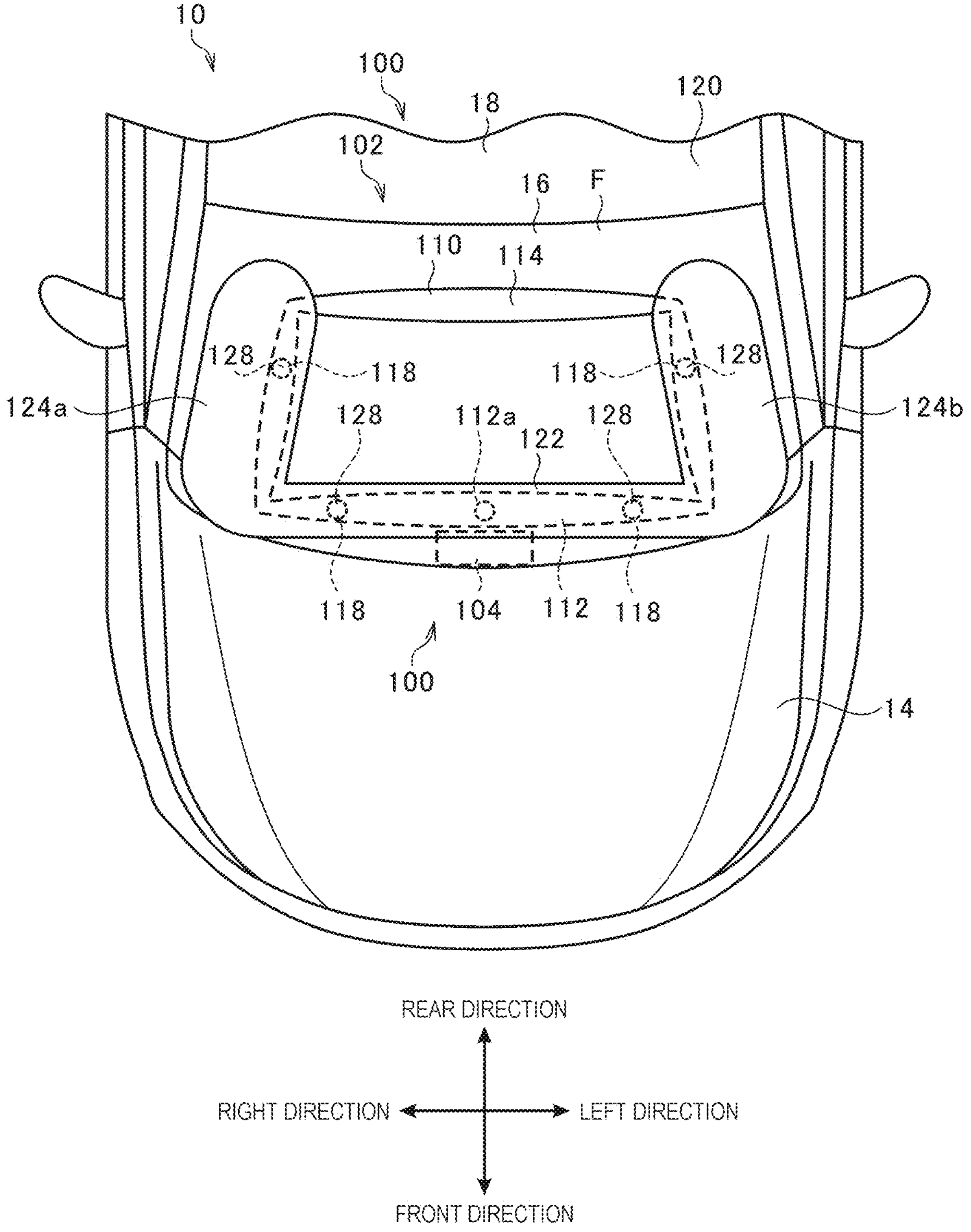
FIG. 5 is a diagram illustrating a deployment process of an upper chamber according to the embodiment.

Next, an operation of the airbag apparatus 100 according to the embodiment will be described with reference to FIGS. 3 to 5. FIG. 4 is a diagram illustrating a deployment process of the lower chamber 110 according to the embodiment. FIG. 5 is a diagram illustrating a deployment process of the upper chamber 120 according to the embodiment. In order to facilitate understanding, the upper chamber 120 is omitted in FIG. 4.

In the vehicle 10, when a collision with a bicycle, a motorcycle, or the like, or a pedestrian is detected, supply of gas from the inflator 104 to the front portion 112 of the lower chamber 110 through the inflow port 112*a* is started. Thus, as illustrated in FIG. 4, the lower chamber 110 is deployed in an order of the front portion 112, the side portion 116*a*, the side portion 116*b*, and the rear portion 114.

When the lower chamber 110 is expanded and the lower chamber 110 reaches the first pressure, the pressure adjustment mechanism 128 is opened. Thus, the supply of the gas from the lower chamber 110 to the upper chamber 120 through the communication ports 118 is started.

Then, as illustrated in FIG. 5, the first extension 122 and the second extensions 124*a* and 124*b* of the upper chamber 120 are deployed. As illustrated in FIG. 3, when the upper chamber 120 is expanded and the upper chamber 120 reaches the second pressure, the supply of the gas from the inflator 104 to the lower chamber 110 is stopped.

3. Effects of Airbag Apparatus

Next, effects of the airbag apparatus 100 according to the embodiment of the disclosure will be described.

The airbag apparatus 100 according to the embodiment includes the lower chamber 110 disposed on the front surface F of the vehicle 10, and the upper chamber 120 located vertically above the lower chamber 110 and supported by the lower chamber 110. The lower chamber 110 has an annular shape. The upper chamber 120 includes the first extension 122 extending in the vehicle left-right direction along the front portion 112 of the lower chamber 110, and the second extensions 124*a* and 124*b* in the pair. Each of the second extensions 124*a* and 124*b* extend in the vehicle front-rear direction along a corresponding one of the side portions 116*a* and 116*b* of the lower chamber 110.

Accordingly, in the airbag apparatus 100 according to the embodiment, the lower chamber 110 has an annular shape so that a posture of the lower chamber 110 can be stabilized. Since the upper chamber 120 according to the embodiment is supported by the stable lower chamber 110, a posture of the upper chamber 120 is also stabilized. Therefore, the lower chamber 110 according to the embodiment can prevent the upper chamber 120 from swinging during deployment. Thus, the airbag apparatus 100 according to the embodiment can prevent a decrease in protection performance of the airbag 102.

Since the airbag apparatus 100 according to the embodiment can prevent the upper chamber 120 from swinging, for example, the airbag apparatus 100 can prevent the upper chamber 120 from deviating from a collision avoidance portion of the vehicle 10. The collision avoidance portion includes, for example, the cowl top panel 12, the A-pillars 20A and 20B, and the roof 18. Therefore, the airbag apparatus 100 according to the embodiment can appropriately dispose the upper chamber 120 above the collision avoidance portion. Thus, the airbag apparatus 100 according to the embodiment can prevent a pedestrian or the like from coming into direct contact with the collision avoidance portion, and can favorably protect the pedestrian or the like.

Since the lower chamber 110 according to the embodiment has an annular shape, the lower chamber 110 is dynamically stable and excellent in rigidity. Since the upper chamber 120 according to the embodiment is supported by the lower chamber 110 which is excellent in rigidity, it is possible to prevent a situation in which upon a collision with a pedestrian or the like, the second extension 124*a* moves to the outside of the vehicle 10 beyond the A-pillar 20A. Similarly, it is possible to prevent a situation in which the second extension 124*b* moves to the outside of the vehicle 10 beyond the A-pillar 20B. Therefore, the airbag apparatus 100 according to the embodiment can hold the pedestrian or the like subjected to a collision between the second extension 124*a* and the second extension 124*b*. Thus, the airbag apparatus 100 according to the embodiment can restrict movement of the pedestrian or the like subjected to a collision to other lanes. Thus, the airbag apparatus 100 according to the embodiment can prevent secondary injury to the pedestrian or the like subjected to a collision.

The lower chamber 110 may have a rectangular annular shape. Thus, the lower chamber 110 can have a shape along the collision avoidance portion, and the upper chamber 120 can be more appropriately disposed above the collision avoidance portion.

The lower chamber 110 may have a pressure higher than that of the upper chamber 120. As described above, the pressure in the upper chamber 120 is set to a pressure suitable for protecting a pedestrian or the like. Thus, the upper chamber 120 favorably protects the pedestrian or the like. On the other hand, since the lower chamber 110 has a pressure higher than that of the upper chamber 120, rigidity of the lower chamber 110 can be further improved.

The upper chamber 120 may be deployed later than the deployment of the lower chamber 110. Thus, the upper chamber 120 can be further prevented from swinging.

MODIFIED EXAMPLES

In the above embodiment, for example, the upper chamber 120 is U-shaped. However, the upper chamber 120 may include at least the first extension 122 and the second extensions 124*a* and 124*b* in the pair, and may not be necessarily U-shaped.

Figure 6:
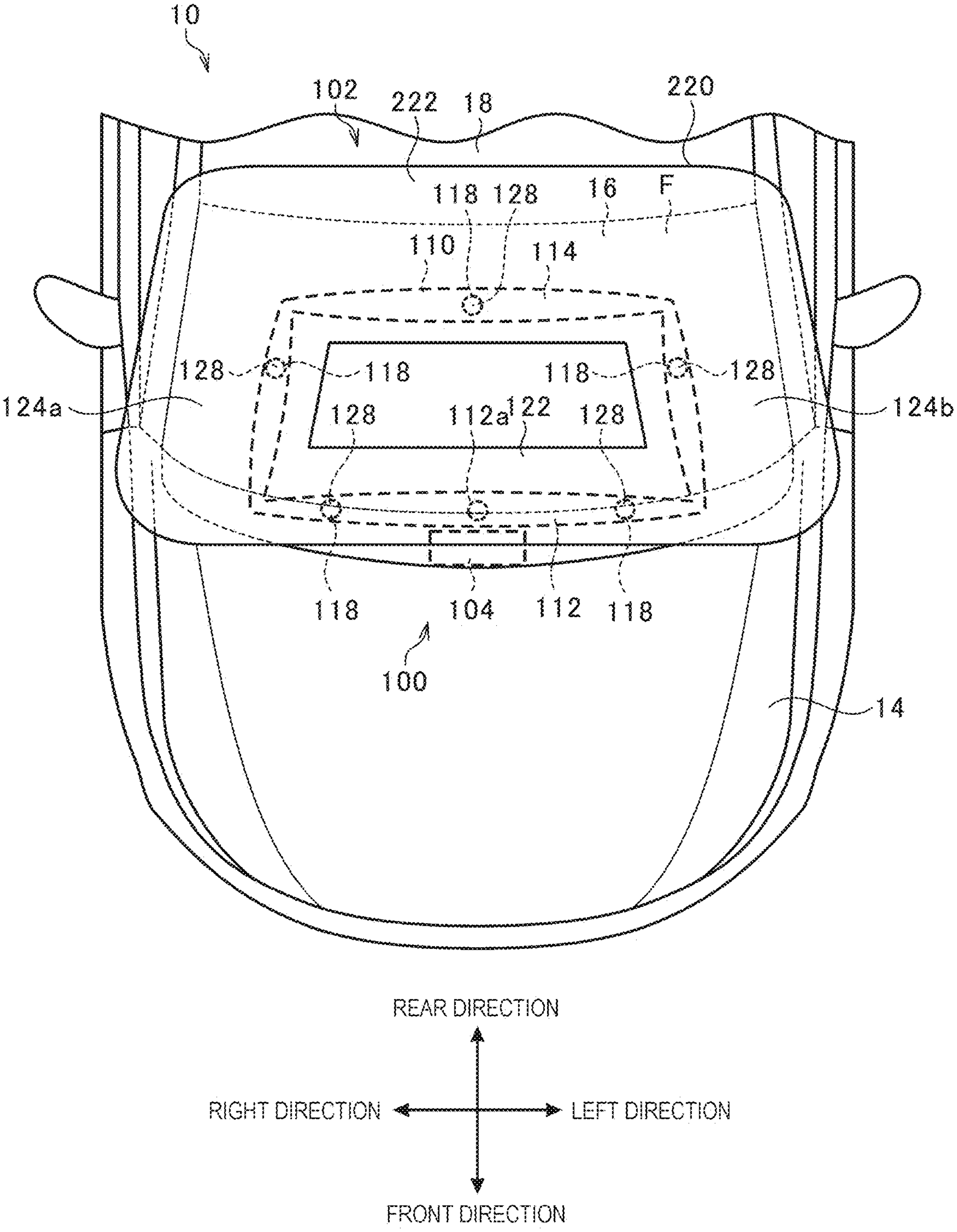
FIG. 6 is a schematic diagram illustrating a schematic configuration of the upper chamber according to a modified example after deployment.

FIG. 6 is a schematic diagram illustrating a schematic configuration of an upper chamber 220 according to a modified example after deployment. As illustrated in FIG. 6, the upper chamber 220 according to the modified example has an annular shape. The upper chamber 220 includes a third extension 222 in addition to the first extension 122 and the second extensions 124*a* and 124*b* in the pair.

The third extension 222 extends in the vehicle left-right direction along the rear portion 114 of the lower chamber 110. The third extension 222 is deployed, for example, above the rear portion 114 of the lower chamber 110. The third extension 222 is sewn, for example, to the rear portion 114 of the lower chamber 110. The third extension 222 has a shape extending in a direction along a shape of a boundary between the windshield 16 and the roof 18. A length of the third extension 222 in the vehicle front-rear direction is longer than a length of the rear portion 114 of the lower chamber 110 in the vehicle front-rear direction. The third extension 222 covers at least the boundary between the windshield 16 and the roof 18. A tether that restricts expansion of the third extension 222 in an up-down direction may be provided in an internal space of the third extension 222. In this case, a shape of a cross section orthogonal to an extending direction of the third extension 222 is an ellipse having a long axis along the vehicle front-rear direction.

In the modified example, the communication port 118 is provided in an upper portion of the rear portion 114, in addition to the front portion 112 and the side portions 116*a* and 116*b* of the lower chamber 110. The communication port 118 provided in the rear portion 114 of the lower chamber 110 communicates with the third extension 222 of the upper chamber 220. The pressure adjustment mechanism 128 is provided on the communication port 118.

In the modified example, a pressure in the upper chamber 220 is also set to a pressure suitable for protecting a pedestrian or the like. The lower chamber 110 may have a pressure higher than that of the upper chamber 220. The upper chamber 220 may be deployed later than the deployment of the lower chamber 110.

Since the upper chamber 220 according to the modified example has an annular shape, the posture of the upper chamber 120 can be stabilized as compared with the upper chamber 120 described above. Thus, the upper chamber 220 according to the modified example can be further prevented from swinging during deployment. Therefore, in the modified example, the upper chamber 220 can be further prevented from deviating from a collision avoidance portion. Therefore, in the modified example, the upper chamber 220 can be more appropriately disposed above the collision avoidance portion. Thus, the upper chamber 220 according to the modified example can further prevent a pedestrian or the like from coming into direct contact with the collision avoidance portion, and can further favorably protect the pedestrian or the like. Since the upper chamber 220 according to the modified example has an annular shape, rigidity is excellent. Thus, the upper chamber 220 according to the modified example can further surely prevent the situation in which upon a collision with a pedestrian or the like, the second extension 124*a* moves to the outside of the vehicle 10 beyond the A-pillar 20A. Similarly, it is possible to further surely prevent the situation in which the second extension 124*b* moves to the outside of the vehicle 10 beyond the A-pillar 20B. Therefore, the upper chamber 220 according to the modified example can hold the pedestrian or the like subjected to a collision between the second extension 124*a* and the second extension 124*b*. Therefore, the upper chamber 220 according to the modified example can further restrict movement of the pedestrian or the like subjected to a collision to other lanes. Thus, the upper chamber 220 according to the modified example can further prevent secondary injury to the pedestrian or the like subjected to a collision.

The embodiments of the disclosure have been described above with reference to the accompanying drawings. The disclosure is not limited to such embodiments. It will be apparent to those skilled in the art that various changes and modifications may be conceived within the scope of the claims, and it is understood that such changes and modifications also fall within the technical scope of the disclosure.

In the above embodiment, for example, the lower chamber 110 has a rectangular annular shape. However, a shape of the lower chamber 110 is not limited as long as the lower chamber 110 has an annular shape. The lower chamber 110 may have, for example, an annular shape of a true circle, an ellipse tubular shape, or an annular shape of a polygonal shape other than a rectangular shape.

In the above embodiment, for example, the lower chamber 110 has a pressure higher than that of the upper chamber 120. However, the lower chamber 110 may have the same pressure as the upper chamber 120 or may have a pressure lower than the upper chamber 120.

In the above embodiment, for example, the upper chamber 120 is deployed later than the deployment of the lower chamber 110. However, the upper chamber 120 may be deployed at the same timing as the lower chamber 110. The lower chamber 110 may be deployed later than the deployment of the upper chamber 120.

In the above embodiment, for example, the lower chamber 110 and the upper chamber 120 communicate directly with each other through the communication ports 118, and the pressure adjustment mechanism 128 is provided on the communication port 118. However, a pressure adjustment mechanism 300 may be provided between the communication port 118 of the lower chamber 110 and the communication port 118 of the upper chamber 120.

Figure 7:
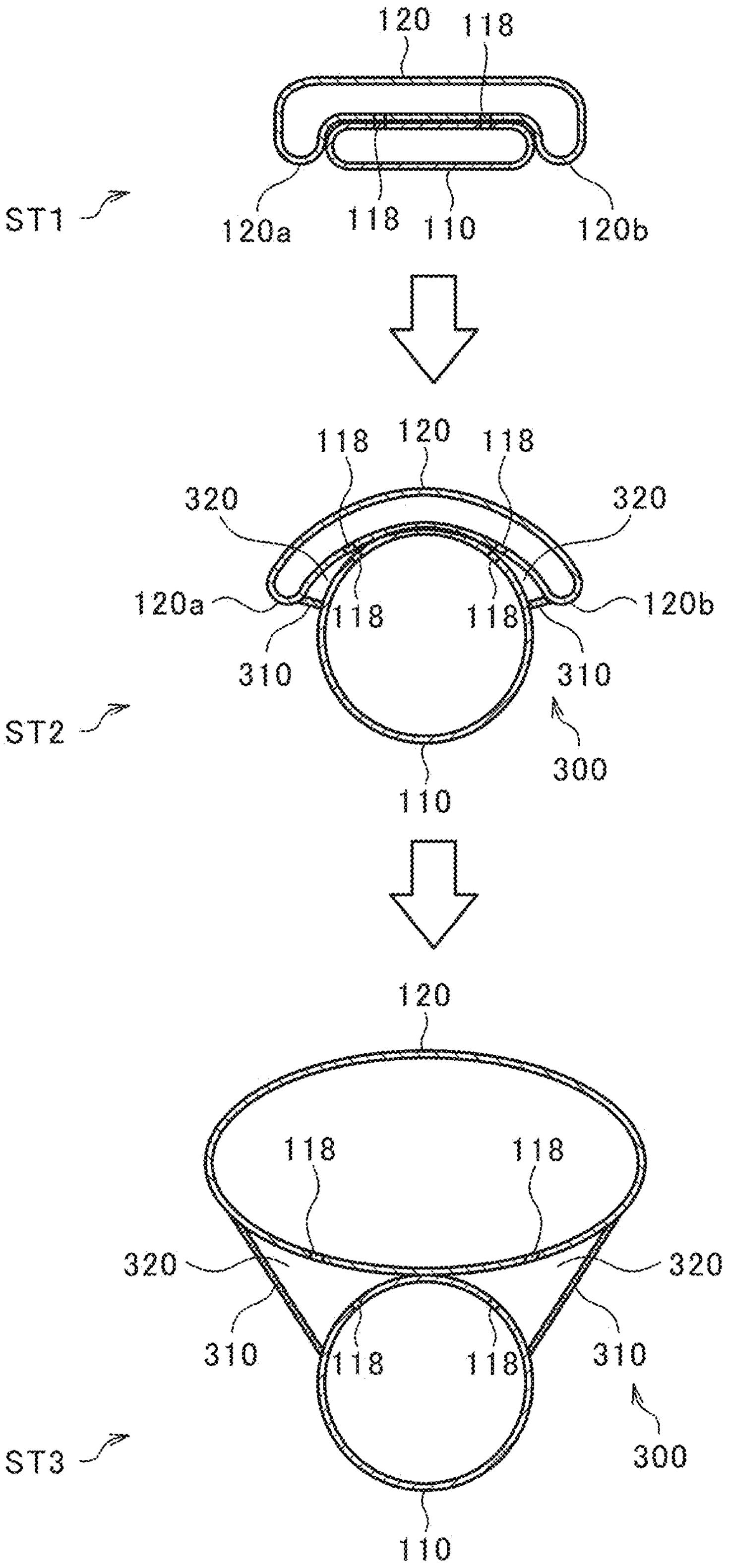
FIG. 7 is a schematic diagram illustrating a schematic configuration of a pressure adjustment mechanism according to the modified example.

FIG. 7 is a schematic diagram illustrating a schematic configuration of the pressure adjustment mechanism 300 according to the modified example. FIG. 7 illustrates a vertical cross section of the lower chamber 110 and the upper chamber 120. As illustrated in FIG. 7, the pressure adjustment mechanism 300 according to the modified example includes passage forming portions 310. The passage forming portion 310 forms a gas passage 320 between a side surface of the lower chamber 110 and a lower surface of the upper chamber 120.

As illustrated in a state ST1 in FIG. 7, first, before deploying the lower chamber 110 and the upper chamber 120, the gas passage 320 is closed by a weight of the upper chamber 120. When the inflator 104 starts to supply the gas, the lower chamber 110 is deployed as illustrated in a state ST2 in FIG. 7. When the pressure in the lower chamber 110 reaches the first pressure, the upper chamber 120 is deformed according to the deployment of the lower chamber 110, and lower ends 120*a* and 120*b* of the upper chamber 120 are raised up and move away from the lower chamber 110. Thus, the lower ends 120*a* and 120*b* of the upper chamber 120 and the side surface of the lower chamber 110 pull the passage forming portions 310 to form the gas passages 320. When the gas passage 320 is enlarged to such an extent as to communicate with the communication port 118 of the lower chamber 110 and the communication port 118 of the upper chamber 120, the supply of the gas from the lower chamber 110 to the upper chamber 120 is started through the gas passages 320 and the communication ports 118.

As illustrated in a state ST3 in FIG. 7, the gas is supplied to the upper chamber 120 until the second pressure is reached.

In the above embodiment, for example, the lower chamber 110 and the upper chamber 120 communicate with each other through the communication ports 118. However, the lower chamber 110 and the upper chamber 120 may not communicate with each other. For example, a first inflator 104 to supply the gas to the lower chamber 110 and a second inflator 104 to supply the gas to the upper chamber 120 may be provided, and the first inflator 104 and the second inflator 104 may be operated.

According to the disclosure, it is possible to prevent a decrease in protection performance of the airbag.

The invention claimed is:

1. An airbag apparatus comprising:
- a lower chamber disposed on a front surface of a vehicle; and
- an upper chamber located vertically above the lower chamber and supported by the lower chamber, wherein
- the lower chamber has an annular shape, and
- the upper chamber comprises
  - a first extension extending in a vehicle left-right direction of the vehicle along a front portion of the lower chamber, and
  - a pair of second extensions, each of the second extensions extending in a vehicle front-rear direction of the vehicle along a corresponding one of side portions of the lower chamber.

2. The airbag apparatus according to claim 1, wherein the lower chamber has a rectangular annular shape.

3. The airbag apparatus according to claim 2, wherein
- the upper chamber further comprises a third extension extending in the vehicle left-right direction along a rear portion of the lower chamber, and
- the upper chamber has an annular shape.

4. The airbag apparatus according to claim 2, wherein the lower chamber has a pressure higher than a pressure of the upper chamber.

5. The airbag apparatus according to claim 2, wherein the upper chamber is configured to be deployed later than deployment of the lower chamber.

6. The airbag apparatus according to claim 1, wherein
- the upper chamber further comprises a third extension extending in the vehicle left-right direction along a rear portion of the lower chamber, and
- the upper chamber has an annular shape.

7. The airbag apparatus according to claim 1, wherein the lower chamber has a pressure higher than a pressure of the upper chamber.

8. The airbag apparatus according to claim 1, wherein the upper chamber is configured to be deployed later than deployment of the lower chamber.

* * * * *